INVENTORS
Richard C. Horton
Marcel R. Alexander, Deceased
By Jeanne E. Alexander
ADMINISTRATRIX
William H. Miller By Staehle & Overman
ATTORNEYS

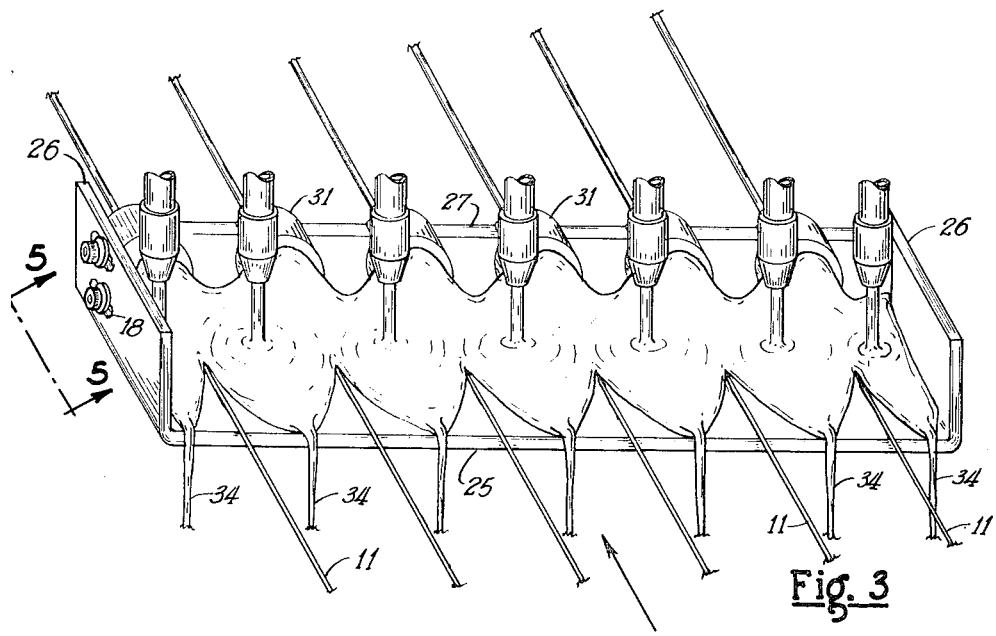
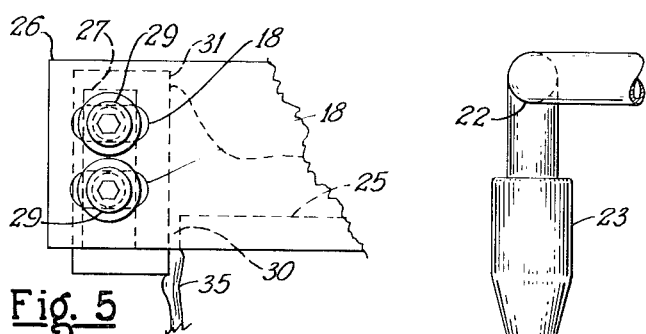
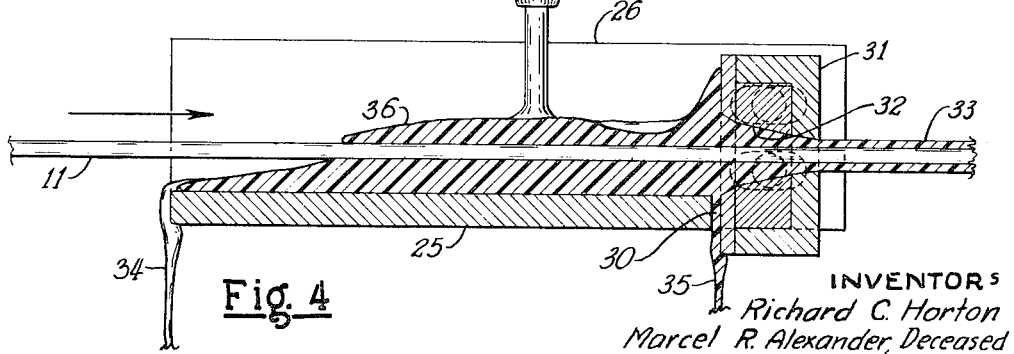
INVENTORS
Richard C. Horton
Marcel R. Alexander, Deceased
By Jeanne E. Alexander
ADMINISTRATRIX
William H. Miller
ATTORNEYS

3,231,414
METHOD OF COATING FLEXIBLE FIBROUS GLASS STRANDS

Richard C. Horton, Millwood, N.Y., Marcel R. Alexander, deceased, late of Central Falls, R.I., by Jeanne E. Alexander, administratrix, Central Falls, R.I., and William H. Miller, Chepachet, R.I., assignors to Owens-Corning Fiberglas Corporation, a corporation of Delaware
Filed Oct. 29, 1959, Ser. No. 849,592
3 Claims. (Cl. 117—102)

This application is a continuation-in-part of application Serial No. 535,388, filed September 20, 1955, for Coating Composition, now forfeited.

This invention relates to a method of coating a flexible fibrous glass strand with a resinous sheath having substantially uniform thickness of the resin around the continuous fiber glass strand, the resin being such a depth as to completely mask the non-specularity of the fibrous glass strand which functions as a core for what then may be called a reinforced resinous monofilament.

The invention has particular utility in the high-speed production of resinous monofilaments such as those used, for examples, for the weaving of insect screening, the formation of tough weather- and vermin-proof tying and binding materials and for the weaving of cloth and textile materials have superior qualities of weather resistance and other characteristics resulting from a combination of the strength of the glass and the qualities of the resinous material with which it is coated.

The instant invention is based upon the discovery that a more nearly uniform sheath of resin may be continuously formed around a flexible fibrous glass strand or yarn which is directed longitudinally at lineal speed by leading the strand at least partly beneath the surface of a mass of liquid resinous material, such as plastisol or organosol, and supplying the plastisol or organosol to the mass of flowing a stream or streams thereof into the mass at points not in line with the strands. Forces created by the flow of resinous material into the mass which might otherwise deflect the glass strands and result in uneven coating thereof are thus absorbed in the mass of the resinous material and do not deflect the strand or yarns from straight line paths.

It is, therefore, the principal object of this invention to provide a method of coating a flexible fibrous glass strand (or yarn) with a resinous sheath wherein a constant supply of the resinous material is maintained upon a horizontal supply plate, the fibrous glass strand being coated is pulled through the mass, being submerged at least partly therein, and liquid resinous material is supplied to the mass in streams which do not impinge upon the path or paths of the strand or strands being pulled through the mass.

Other and more specific objects and advantages of a method embodying the invention will be apparent from the description which follows, reference being had to the accompanying drawings, in which:

FIG. 3 is a fragmentary view in perspective and on an enlarged scale of the coating means embodying the invention as operated according to the invention;

FIG. 4 is a greatly enlarged fragmentary vertical sectional view showing the strand being led through a mass of liquid resin and the replenishment of the resin according to the invention;

FIG. 5 is a fragmentary view in elevation taken from the position indicated by the line 5—5 of FIG. 3.

Figure 1:
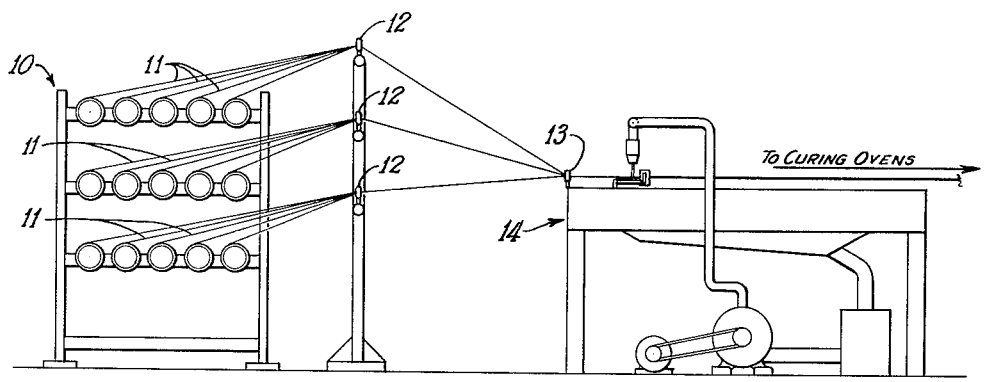
FIG. 1 is a simplified view in elevation of the beginning end of a production line designed according to the invention and upon which the method of the invention may be carried out.
Figure 2:
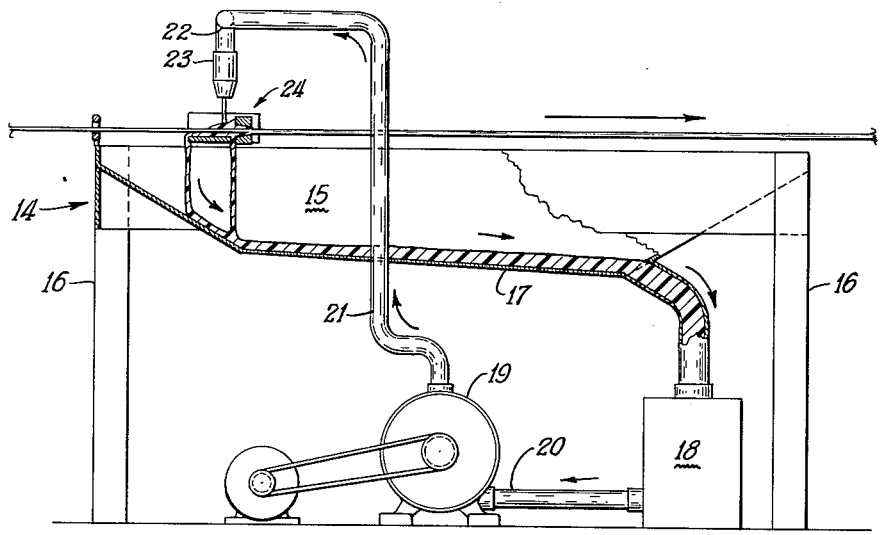
FIG. 2 is a vertical, fragmentary sectional view on an enlarged scale, of the coating apparatus of the production line partially illustrated in FIG. 1.

Apparatus embodying the invention and upon which the method of the invention may be carried out is designed to be employed for the coating of continuous flexible glass fiber strands or yarns. A creel generally indicated at 10 in FIGURE 1 is provided as a source for a plurality of individual strands or yarns 11 which are led through suitable guide eyes 12 and 13, being arranged in substantial parallelism and led into the apparatus of the invention. The guide eyes 13 are all arranged in side-by-side relationship across the front of a coating table generally indicated at 14. The coating table 14 (FIG. 2) comprises a tank 15 suppported upon legs 16 and having an inclined bottom 17 which leads to a supply sump 18. A motor driven pump 19 is connected by a line 20 to the sump 18 and a main supply pipe 21 leads upwardly from the pump 19 to a cross manifold 22. In a production apparatus where more than one strand or yarn 11 is to be simultaneously processed according to the invention, a plurality of downwardly directed nozzles 23 communicate with the cross manifold 22.

A bridge structure generally indicated at 24 extends across the table 14 above the tank 15. The bridge structure 24 comprises a horizontal plate 25 and side or end plates 26. A cross-bar 27 (FIG. 3) extends across between the end plates 26 and is adjustably supported thereby. Each of the end plates 26 has a pair of horizontal slots 18 (FIG. 5) through which there extend machine screws 29 that are threaded into tapped holes in the ends of the bar 27. By loosening the screws 29, the bar 27 may be moved longitudinally relative to the plate 25 to vary the width of an opening 30 (FIG. 4) between the far edge of the plate 25 and the bar 27. The bar 27 mounts a plurality of wiping dies 31 each of which has a converging orifice 32, with the orifices extending horizontally and with their smaller ends directed away from the cross plate 25 as illustrated in FIG. 4. There is one of the wiping dies 31 for each of the strands or yarns 11 which is to be treated according to the invention.

Each of the yarns or strands 11 is led through its respective wiping die 31 and from there through a suitable curing oven (not shown) and to a wind-up machine which supplies the tension for pulling the strand or yarn 11 through the mass of coating material and off of the creel 11.

The pump 19 is operated at such speed and has such capacity that it feeds a liquid resinous material, i.e., preferably a plastisol or an organosol, for instance of a vinyl resin or a combination of similar resins, from the ends of the nozzles 23 at a total rate at least slightly in excess of the rate at which the resinous material is entrained by and carried away by the stands or yarns 11 in the form of tubular sheaths 33 (FIG. 4).

It will be observed particularly in FIGURE 3, that the nozzles 23 are spaced laterally away from the paths of movement of the strands or yarns 11. It will also be observed that the streams of resinous material flowing from the nozzles 23 impinge upon the plate 25 between the parallel, spaced strands of yarns 11, actually, of course, impinging upon a mass of the viscous organosol or plastisol which accumulates upon the plate 25. By impinging these streams of resinous material upon the plate 25 or upon the constantly maintained mass of liquid resinous material on the plate 25, the force exerted by the downwardly flowing streams of resinous material and horizontal components of such force resulting from impact of the streams and the flow of the material, has no mechanical effect upon the strands or yarns 11 which tends to displace them either laterally or vertically. The force of the downwardly flowing resin from the nozzles 23 is absorbed in the mass of resin on the plate 25. Therefore, the strands or yarns 11 can be held centered in the respective wiping dies 31 merely by the pulling tension, so as to produce sheaths 33 around the yarns or strands 11 of closely uniform thickness in all directions.

It will be observed particularly in FIGS. 3 and 4 that small streams of resin, generally indicated at 34 and 35, are shown as flowing both off the rear edge of the plate 25 and through the opening 30 at the front edge of the plate 25. It has been found desirable in this method and apparatus to supply resin to the plate 25 in excess of the quantity required in order that a substantial mass of resinous material may be maintained on the plate 25 at all times. The tackiness of the resin material causes the material to be entrained with the yarns or strands 11 and to thus pile up against the inner faces of the dies 31 and against the bar 27 between the dies 31. By adjusting the horizontal spacing between the cross-bar 27 and the edge of the plate 25, the rapidity of overflow of the resin through the space 30 may be controlled to control the degree of pile-up of the resin against the inner faces of the dies 31 and the bar 27 to assure a sufficient quantity to thoroughly and completely coat each of the yarns or strands 11.

In operation of the process according to FIGURE 4 a substantial mass of liquid resinous material, generally indicated at 36, is built up on the plate 25 before the strands or yarns 11 are started and the rate of feed of the material from the nozzles 23 is kept high enough to supply an excess of material and to maintain the mass at a rather deep level. As a result, the strands or yarns 11 penetrate beneath the upper surface of the mass of resin 36, being completely submerged therein enroute to the dies 31.

Figure 6:
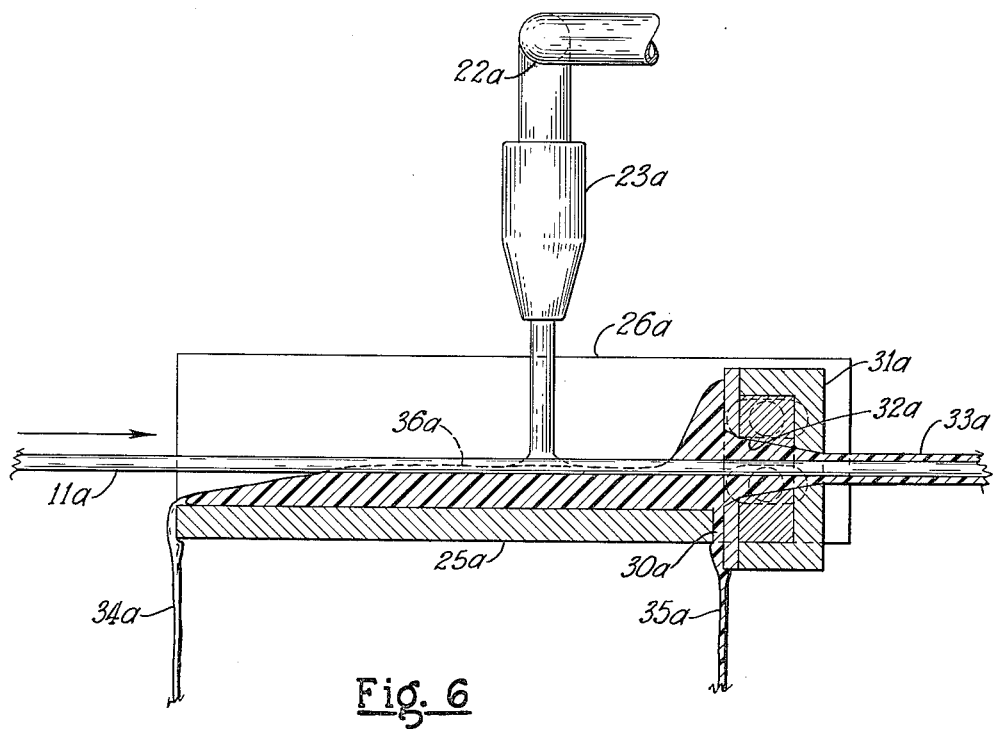
FIG. 6 is a view similar to FIG. 4 but showing a modification in the process embodying the invention.

According to a modification of the process of the invention, as illustrated in FIG. 6, apparatus embodying the invention is operated in a different manner. In operating according to FIG. 6, a mass of resin generally indicated at 36a is less deep than the mass of resin 36 of FIG. 4. In this modification of the process, the depth of the resin 36a is maintained so that the strands or yarns 11a "float" on the generally horizontal surface thereof in line with the center of its orifices 32a in the dies 31a. The surface tension of the liquid resinous material assists in controlling the depth of partial submergence of the strands or yarns 11a in the resinous material 36a.

In FIG. 4 the strand 11 is shown as being led completely beneath the surface of the resinous liquid mass 36 and in the modified process illustrated in FIG. 6, the strand 11a is shown as being led partly beneath the surface of the liquid resinous mass 36a.

What we claim is:

1. A method for simultaneously coating a plurality of fibrous strands comprising moving each of said strands linearly along a given path in parallel side-by-side spaced relation to the other strands across and above a horizontal surface, depositing liquid coating material on such surface by pouring a separate stream of coating material downwardly onto the surface between the paths of movement of each pair of immediately adjacent parallel strands and by pouring additional separate streams displaced laterally outwardly of the paths of movement of the two outermost strands downwardly thereonto to maintain a mass of the coating material on the horizontal surface into which and at least partly beneath the surface of which mass the strands are moved, and at a rate in excess of the rate at which said coating material is pulled away with said strands, whereby some of the coating material overflows the plate, and then passing each of said strands and coating material entrained therewith through a shaping orifice extending horizontally, at about the level of, and immediately adjacent an edge of said plate for spreading an even coat thereover.

2. A method as claimed in claim 1 wherein the strands are only partially beneath the surface of the mass of the coating material on the horizontal surface.

3. A method as claimed in claim 1 wherein the strands are completely beneath the surface of the coating material on the horizontal surface.

References Cited by the Examiner
UNITED STATES PATENTS

| | | | |
|---|---|---|---|
| 2,093,238 | 9/1937 | Domm | 118—420 |
| 2,328,096 | 8/1943 | Reevely | 117—115 X |
| 2,647,296 | 8/1953 | Shive | 117—126 |
| 2,684,318 | 7/1954 | Meek | 117—115 X |
| 2,867,891 | 1/1959 | Horton et al. | 117—126 |
| 2,881,732 | 4/1959 | Chrystman | 117—126 |
| 2,910,383 | 10/1959 | Miller et al. | 117—126 |
| 2,929,738 | 3/1960 | Bateson et al. | 117—126 |
| 2,954,687 | 10/1960 | Yazawa et al. | 28—59 X |

RICHARD D. NEVIUS, *Primary Examiner.*